UNITED STATES PATENT OFFICE.

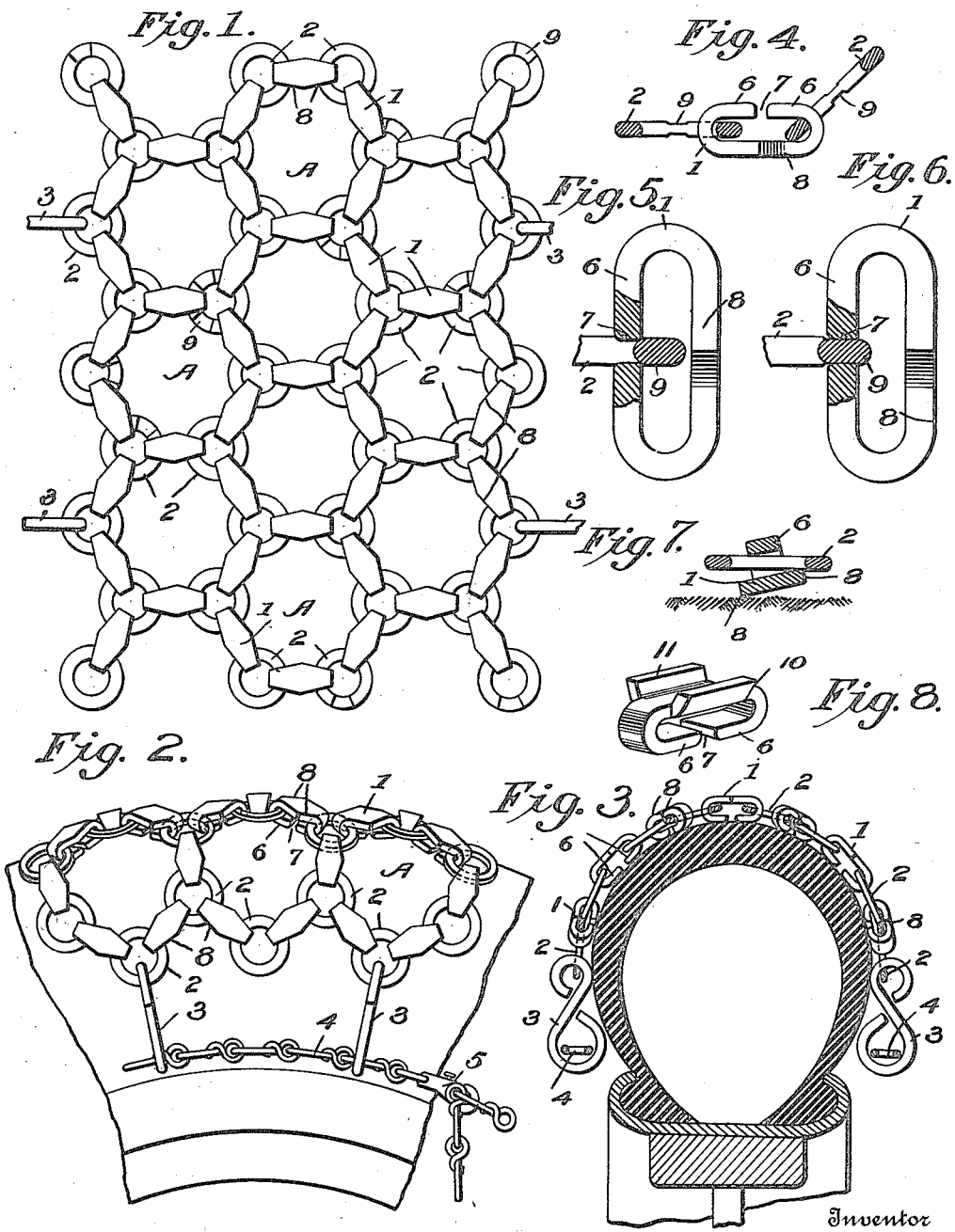

GEORGE P. F. ECKERT, OF WILKES-BARRE, PENNSYLVANIA.

TIRE-PROTECTOR.

1,229,244. Specification of Letters Patent. Patented June 12, 1917.

Application filed April 1, 1916. Serial No. 88,352.

*To all whom it may concern:*

Be it known that I, GEORGE P. F. ECKERT, a citizen of the United States, residing at Wilkes-Barre, Luzerne county, Pennsylvania, have invented new and useful Improvements in Tire-Protectors, of which the following is a specification.

This invention relates more particularly to tire protectors of that type which fits snugly upon the tire, without creeping therearound.

One object is to provide a simple and durable protector, which is readily manufactured and assembled at a minimum of expense.

I effect this by providing a protector, the body of which is formed of but two elements, a ring and an open link assembled in any convenient design. The two elements are readily formed from flat sheet metal, and are hardened, tempered or annealed before assembling, thereby reducing the expense of manufacture, and rendering the protector most durable.

The rings and split links comprising the protector, are readily assembled by unskilled labor, thus permitting a further reduction in the cost of manufacture.

Another object is to provide an improved protector, which is more effective to prevent sluing or sidewise skidding, than those heretofore devised.

Other objects, such as adjustability of one size protector to tires of varying sizes; wear-resisting, and wear take up qualities, ease of repairing, and further advantages, will be more fully referred to hereinafter and particularly pointed out in the claims.

In the accompanying drawings, Figure 1 is a plan view of a preferred form of the protector, showing the continuous, hexagonally cellular tread surface;

Fig. 2 is a side view, showing the manner of application of the protector to the tire, and its retaining means;

Fig. 3 is a transverse sectional view through a tire equipped with my invention;

Fig. 4 is an enlarged detail view of a link and two rings;

Fig. 5 is an enlarged detail view of one of the open links, showing a fragmentary portion of a ring held therein;

Fig. 6 is a similar view, showing the swaged portion of the ring in alinement with the opening in the link;

Fig. 7 is a detail sectional view, showing a link tilted to grip the road bed, and prevent or arrest skidding, and Fig. 8 is an enlarged detail perspective view of an ice calk which may be readily substituted for the wear or split links.

The protector comprises a series of flat links 1 and rings 2 assembled to form a net of any particular design desired, and lying flat on the tire. By experimentation, I have decided that the mesh arrangement shown in Fig. 1 is the most preferable, the meshes lying in parallel series.

Referring to this figure, it will be seen that the links and rings are arranged in a mesh form, the meshes A being roughly hexagonal in contour, and in the illustration, there are shown three alined circumferentially extending series of such meshes arranged in parallelism to fit over and inclose the tread of a tire.

Slip links or eyes 3 are connected to rings 2 along the two side edges of the protector, such eyes being arranged directly opposite each other. The slip links 3 may connect with each ring 2 at the outermost corners of the several hexagonal meshes A, but preferably, I attach the slip links to the rings at the outer corners of each alternate mesh, along the side edges of the protector.

Flexible retaining members, as chains 4, pass through the slip links or eyes 3, on the opposite side edges of the protector, and are drawn taut and held in such positions by any suitable fastenings, as snap hooks 5. By tautening the chains, pressure is thus placed on the slip links to draw the protector snugly about the periphery of the tire, transversely thereof.

The flexible retaining members 4 are under comparatively slight strain, such members slipping easily through the eyes of links 3, so that slack or wear between the rings and wear links may be readily taken up by shortening the flexible members.

By locating the eyes or slip links 3 directly opposite each other on the respective side edges of the protector, the retaining members impose a constant, even tension on the protector, which is distributed obliquely in opposite directions thereacross, and causes the protector to conform exactly to the transverse arc of the tire, as well as maintaining the meshes in shape over the whole tread, and preventing the protector from creeping or slipping about the tire.

The meshes of which the protector is composed, cover and protect the tread of the tire, the broad-faced wear links 1, contacting the road bed and sustaining the wear incident thereto. The hexagonal mesh protector affords the largest metallic wearing surface with a minimum amount of metal, to prevent skidding or sliding on smooth pavements, and at the same time provides a flexible tire covering which permits it to be fitted snugly upon the tire without buckling, and protects the tire from contact with rough surfaces.

As the protector fits snugly about the tire without creeping therearound, and constitutes a continuous mesh tread, it obviates slippage between the protector and wheel, which would cause torsional strains and wear on the gears and chassis, as in those tire chains which do not provide a continuous tread, and are designed to creep about the tire.

A single protector constructed in accordance with my invention, is applicable to a comparatively wide range of different sized tires. In applying my protector to tires of smaller sizes, the flexible retaining members 4 are shortened to draw the opposite side edges of the protector snugly down around the transverse arc of the tire, thereby elongating the hexagonal meshes A transversely and shortening their diameters circumferentially of the tire, on the lazy-tongs principle, to decrease the over-all length of the protector. Of course, this results in extending the protector radially inward on the opposite sides of the tire. Vice versa, in applying the protector to tires of larger circumference, the diameters of the meshes circumferentially of the tire are lengthened, and their transverse or lateral diameters shortened, thereby increasing the length of the entire protector which, in such case, will not extend so far down on the sides of the tire, when in place around the wheel.

Adjustability of the protectors to different sized tires may also be obtained by providing the user with extra rings and links. Owing to the open wear links 1, the protector may be split or disconnected at any point.

The user can remove a sufficient number of the links and rings to reduce the length of the protector to conform to the circumference of a smaller tire, and shorten the flexible connections to correspond, or by adding additional links and rings to the protector, it may be applied to tires of larger sizes.

The loose connection of the retaining members 4 and the slip links or eyes 3 is essential to either form of adjustment, otherwise the protector will buckle and break in use, when applied to tires of smaller circumference.

In operation, there may be a slight bulging movement of the protector, as the wheel travels over the road bed, such bulging movement occurring just in front of that portion of the tire which contacts the road, due to the flattening of the tire at that point, and effective to loosen and discharge mud or other material which may tend to collect and cake in the meshes of the protector. The relative movement between the links 1 and rings 2 relieves these parts of material collecting therein.

It will be observed that the tire protector practically comprises but two parts, the open wear links 1 and the solid rings 2. The rings 2 are preferably stamped from flat sheet metal, as are the blanks from which the wear links 1 are made, thus reducing the bulk and thickness of the protector. The blanks for the wear links preferably comprise a substantially elongated hexagonally-shaped body portion 1, the longest diameter of which is extended to form arms 6, which are bent toward each other, underneath and parallel with the body-portion to form an open link.

The opening 7 between the free ends of the arms, is of less width than the width and thickness of metal in the flat rings 2, to prevent any possibility of accidental disengagement of the rings and links when assembled and in place on the tire, and the space between the arms 6 and the body portion 1 is of slightly less width than the width of metal in the flat rings 2 (see Fig. 4), to prevent the latter from turning at right angles to the links, when in assembled position.

The body portions or wearing surfaces 1, of the links, lie in planes beyond the planes of the rings 2, to have full contact with the road bed, and to prevent and arrest sluing, slipping, or skidding. The space between the arms 6 and body portion 1 is sufficient to enable the links to swivel or turn slightly on their longer axes to one side or the other, relatively to the rings (Fig. 7), to present any of the obtusely angular edges 8 of the wear faces to the road bed, to grip the latter when the car is skidding sidewise at any angle to its direction of travel, or on turns. By making the parts of flat material, a greater swiveling or relative turning of the links is obtained with a minimum of thickness of protector.

When the protector is in use, the rings 2 work relatively to the links to distribute the wear throughout the entire inner circumference of the rings, which lengthens the life of the protector. The rings 2 also enable the wear links 1 to freely shift about the circumferences of the rings to enable the links to assume any angle radial to the rings, in line with the lines of tension imposed on the protector by the flexible retaining members 4.

The end edges of the arms 6 of the wear links may be rounded on the side next to the tire to prevent injury to the latter.

The rings 2 are swaged, as at 9, at one point in their circumference to enable them to be inserted in, or removed from the links. In assembling, the ring is held at right angles to the link, with its swaged or thinned portion 9 opposite the opening 7 in the link. The swaged portion of the ring is then inserted between the ends of the arms 6 of the link (Fig. 6), and the ring then swung parallel with the link. To disengage a ring and link, the swaged portion 9 of the ring is first positioned beneath the opening 7 in the link, and the ring then turned at right angles to the link, after which it may be withdrawn from the link. The ring and link cannot turn at right angles to each other, unless the swaged portion of the ring is opposite the slot 7, when linked together. Each link engages two rings. The links and rings may be assembled in meshes of pentagonal, hexagonal or other shape, the meshes being connected to form any preferred design.

By reason of the ready engagement and disengagement of the rings and links forming the protector, repairs are easily and quickly made without removing the protector from the wheel, it being necessary merely to release the retaining members or chains 4 to loosen the fabric of the protector on the tire, sufficiently to enable the damaged link or ring to be removed, and a new one substituted, after which the retaining members are tautened and fastened in such position.

A very important feature of the invention, and one which enables me to provide a protector of great wear-resisting qualities, is that by reason of my construction, the rings and links, after being formed, may be thoroughly and properly hardened or tempered before they are assembled. This I am enabled to do because I regulate the size of the openings in the links, and the width of metal in the rings 2, so that the rings and links, after assembly, cannot accidentally become disengaged. This obviates the necessity of welding the links, which welds would otherwise prevent hardening of the parts.

The cost of manufacture of my protector compared with others is materially lower; the number of elements composing the protector is reduced to a minimum, and their assembly is readily effected by unskilled labor.

Not only are protectors manufactured in accordance with my invention, very durable and efficient in the performance of their purposes, but in addition, they reduce the wear on the tires and obviate blow outs and repairs to the tires due to such wear.

If desired, ice calks 10 (Fig. 8) may be substituted for some, or all of the links 1. These ice calks are very similar to the links 1, except that instead of having a lozenge-shaped wear face, they are provided along their opposite sides with calks 11 to grip the surface. The calks diverge, as shown, to relieve themselves from material tending to cake therein. This shape also tends to keep the calks sharp by contact with the road.

Changes may be made in the form and arrangement of the several parts described, without departing from the spirit and scope of this invention.

What I claim as new, is:—

1. The combination with a tire; of a protector comprising links and flattened rings interconnected to form a continuous flexible network of open meshes, each mesh being formed of several links and rings, the links of each mesh arranged at varying angles to the direction of rotation of the tire, and each comprising an integral piece of metal having an elongated wear face, arms extending from the wear face and bent over underneath the wear face to lie substantially parallel therewith in opposed relation so that the distance between the arms and the wear face is less than the width of the flattened rings, and accommodates the thickness of the rings, the free ends of the arms being spaced apart from each other a sufficient distance to permit the entrance of the rings edgewise therebetween and at right angles to the link, after which the rings are turned while still adjacent the space between the free ends of the arms, to lie substantially parallel with the link, the width of the rings being greater than the distance between the free ends of the arms.

2. The combination with a tire; of a protector comprising interconnected links and rings forming a net work of open meshes, each mesh being formed of several links and rings, the links of each mesh arranged at varying angles to the direction of rotation of the tire, and having substantially hexagonal wear faces, the angular side edges of which grip the road at any angle at which the tire may skid, the links and rings adapted for relative movement, the rings each lying in contact with the tire, the broad wear faces of the links lying in planes outside the rings.

3. A tire protector comprising a plurality of interconnected links and rings arranged to form a continuous net work of open meshes arranged in parallel series circumferentially of the tire, each mesh being formed of several links and rings, the links of each mesh arranged at varying angles to the direction of rotation of the tire, the rings lying in contact with the tire; the links terminating at opposite ends in arms bent over substantially parallel with the under surface of the wear face, the ends of the arms spaced apart just sufficiently to permit swaged portions of the rings to pass between the ends of the arms; the width of the rings from their inner to their outer circumferences being slightly greater than the space between the arms and the under surfaces of the wear faces, to prevent the rings from swinging at right angles to the links, and the thickness of the rings being less than the space between the arms and the under surfaces of the wear links to enable the links to swivel or tilt relatively to the rings when the wheel is skidding.

GEORGE P. F. ECKERT.